United States Patent
Tsai et al.

(10) Patent No.: US 9,467,669 B2
(45) Date of Patent: Oct. 11, 2016

(54) WAVELENGTH CONVERSION MODULE AND PROJECTOR

(71) Applicants: Te-Ying Tsai, Hsin-Chu (TW); Tsung-Ching Lin, Hsin-Chu (TW)

(72) Inventors: Te-Ying Tsai, Hsin-Chu (TW); Tsung-Ching Lin, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 14/732,776

(22) Filed: Jun. 7, 2015

(65) Prior Publication Data
US 2016/0219256 A1    Jul. 28, 2016

(30) Foreign Application Priority Data

Jan. 22, 2015 (TW) .............................. 104102113 A

(51) Int. Cl.
*G03B 21/20* (2006.01)
*G03B 21/16* (2006.01)
*H04N 9/31* (2006.01)
*G02B 26/00* (2006.01)

(52) U.S. Cl.
CPC .......... *H04N 9/3144* (2013.01); *G02B 26/008* (2013.01); *G03B 21/16* (2013.01); *G03B 21/204* (2013.01); *H04N 9/3111* (2013.01)

(58) Field of Classification Search
CPC  G03B 21/204; G03B 21/16; G03B 21/2093; G03B 21/20; G03B 21/14; G03B 21/202; G03B 21/206; H04N 9/3114; H04N 9/3117; H04N 9/3144; F21S 10/007; F21S 10/00

USPC .......................... 353/84, 52, 57, 58, 60, 61; 359/885–892
See application file for complete search history.

(56) References Cited

U.S. PATENT DOCUMENTS

| | | | |
|---|---|---|---|
| 2003/0095349 A1* | 5/2003 | Inamoto | F04D 17/08 359/889 |
| 2007/0273839 A1 | 11/2007 | Doi et al. | |
| 2008/0225239 A1* | 9/2008 | Tan | G03B 21/16 353/61 |
| 2012/0013854 A1* | 1/2012 | Nishimura | G03B 21/16 353/57 |

FOREIGN PATENT DOCUMENTS

| | | |
|---|---|---|
| CN | 102478750 | 5/2012 |
| CN | 102853377 | 1/2013 |
| JP | 2005173019 | 6/2005 |
| TW | M331128 | 4/2008 |
| TW | 200834219 | 8/2008 |

* cited by examiner

*Primary Examiner* — William C Dowling
*Assistant Examiner* — Ryan Howard
(74) *Attorney, Agent, or Firm* — Jianq Chyun IP Office

(57) ABSTRACT

A wavelength conversion module, includes a wavelength conversion device and at least one heat dissipation airflow providing device. The wavelength conversion device has at least one side surface. The heat dissipation airflow providing device has an outlet, wherein the outlet faces the side surface, and the heat dissipation airflow providing device is adapted to provide a heat dissipation airflow to the side surface from the outlet. A distance between a geometry center of an orthogonal projection of the outlet on the side surface and a geometry center of the side surface is smaller than or equal to half of a maximum inner diameter of the outlet. In addition, a projector having the wavelength conversion module is also provided.

20 Claims, 4 Drawing Sheets

WAVELENGTH CONVERSION MODULE AND PROJECTOR

CROSS-REFERENCE TO RELATED APPLICATION

This application claims the priority benefit of Taiwan application serial no. 104102113, filed on Jan. 22, 2015. The entirety of the above-mentioned patent application is hereby incorporated by reference herein and made a part of this specification.

BACKGROUND OF THE INVENTION

1. Field of the Invention

The invention relates to an optical module and an optical device having the optical module, and more particularly, to a wavelength conversion module and a projector having the wavelength conversion module.

2. Description of Related Art

Recently, projection apparatuses which adopted solid state light sources such as light-emitting diode (LED) and laser diode have gradually became the mainstream in the market. Since a laser diode has a light emitting efficiency higher than about 20%, pure light sources of a projector which are generated by exciting phosphor powder with laser diodes are gradually being developed, in order to break through the limits of LED light sources. In addition, a laser projection apparatus can excite phosphor powder with laser, and it can also directly use the laser as a light source of the projector, and the laser projection apparatus has advantage of adjusting the number of light sources according to demand of brightness, in order to achieve the demand of the projector with different brightness. Therefore, using a laser as a light source of projector architecture has a tremendous potential to replace methods of using conventional ultra high pressure (UHP) lamps and become a new mainstream of light sources of projectors.

In existing laser projectors, a phosphor wheel is formed by filling phosphor powder on a metal substrate with high reflectance, and light with different colors (e.g. green light and yellow light) is generated by exciting the phosphor powder on the metal substrate with a laser emitted by a laser light source, and the laser (e.g. blue light) can directly go through the phosphor wheel by going through a slot on the metal substrate, in order to generate light with multiple colors. The radiation of the laser makes the temperature of the phosphor wheel rise, and over high temperature of the phosphor wheel may cause the glue using for coating the phosphor powder to be overheated and charred, which lead to decreasing optical efficiency of the projector and affecting the projection brightness and durable life thereof.

China patent number 102853377 discloses a wavelength conversion device, wherein the heat transfer rate between a driving device, a wavelength conversion layer, and a box is increased by an inner fan. U.S. patent number 20070273839 discloses a projector, wherein the heat of a color wheel is dissipated by a blowing fan. China patent number 102478750 discloses a color wheel module, the heat dissipation airflow generated by a blowing fan is guided along a wind channel to an outlet, and flows from the outlet to a light transmission zone of a light sensing device, so as to remove the dust above the light transmission zone.

The information disclosed in this BACKGROUND section is only for enhancement of understanding of the BACKGROUND section of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY OF THE INVENTION

The invention provides a wavelength conversion module and a projector having the wavelength conversion module, capable of performing heat dissipation on a wavelength conversion device effectively.

Other advantages and targets of the invention should be further indicated by the disclosures of the invention.

To achieve at least one of the above-mentioned objectives, one embodiment of the invention provides a wavelength conversion module which includes a wavelength conversion device and at least one heat dissipation airflow providing device. The wavelength conversion device has at least one side surface. The heat dissipation airflow providing device has an outlet, herein the outlet faces the side surface, and the heat dissipation airflow providing device is adapted to provide a heat dissipation airflow to the side surface from the outlet. A distance between a geometry center of an orthogonal projection of the outlet on the side surface and a geometry center of the side surface is smaller than or equal to half of a maximum inner diameter of the outlet.

One embodiment of the invention provides a wavelength conversion module, herein a distance between the outlet and the side surface ranges in length 5~50 mm.

One embodiment of the invention provides a wavelength conversion module, herein the outlet is a rectangle, and a maximum inner diameter of the outlet equals to a length of a diagonal line of the rectangle.

One embodiment of the invention provides a wavelength conversion module, herein a number of the at least one side surface is two, the two side surfaces face each other, a number of the at least one heat dissipation airflow providing device is two, the wavelength conversion device is disposed between the two heat dissipation airflow providing devices, and the outlet of each of the heat dissipation airflow providing devices faces the corresponding side surface.

One embodiment of the invention provides a wavelength conversion module, herein the heat dissipation airflow providing device has a wind-guiding cover, and the wind-guiding cover is connected to the outlet and guide the heat dissipation airflow toward the side surface.

One embodiment of the invention provides a wavelength conversion module, herein the wind-guiding cover has a first opening and a second opening opposite to each other, the first opening is connected with the outlet, the second opening faces the side surface, and an inner diameter of the second opening is smaller than or equal to an outer diameter of the side surface.

One embodiment of the invention provides a wavelength conversion module, herein the wavelength conversion device includes a phosphor wheel or a color filter wheel.

One embodiment of the invention provides a wavelength conversion module, herein the wavelength conversion device includes a driving unit and a sensing unit, the driving unit is connected to the phosphor wheel and adapted to drive the phosphor wheel to rotate, and the sensing unit is disposed on one side of the driving unit and adapted to sense an operation state of the driving unit.

One embodiment of the invention provides a wavelength conversion module further includes an enclosed cavity and a heat dissipation structure, the wavelength conversion device and the heat dissipation airflow providing device are disposed inside the enclosed cavity, the heat dissipation structure includes a first portion and a second portion connected to each other. The first portion is located inside the enclosed cavity and the second portion is located outside the enclosed cavity, and the heat dissipation airflow flows through the wavelength conversion device and the first portion sequentially, and the heat energy of the heat dissipation airflow is transferred through the first portion to the second portion.

One embodiment of the invention provides a wavelength conversion module, herein the heat dissipation airflow providing device is a centrifugal fan, an axial fan, or a refrigerating air-conditioning blower.

To achieve at least one of the above-mentioned objectives, one embodiment of the invention provides a projector which includes a light source, a light valve, a lens, and a wavelength conversion module. The light source is adapted to provide an illumination light beam, the light valve is disposed on a transmission path of the illumination light beam and adapted to covert the illumination light beam to a image light beam. The lens is located on a transmission path of the image light beam and adapted to convert the image light beam to a projection light beam, and the wavelength conversion module is disposed on the transmission path of the illumination light beam and located between the light source and the light valve. The wavelength conversion module includes a wavelength conversion device and at least one heat dissipation airflow providing device. The wavelength conversion device has at least one side surface. The heat dissipation airflow providing device has an outlet, herein the outlet faces the side surface, and the heat dissipation airflow providing device is adapted to provide a heat dissipation airflow to the side surface from the outlet. A distance between a geometry center of an orthogonal projection of the outlet on the side surface and a geometry center of the side surface is smaller than or equal to half of a maximum inner diameter of the outlet.

One embodiment of the invention provides a projector, herein a distance between the outlet and the side surface ranges in length 5~50 mm.

One embodiment of the invention provides a projector, herein the outlet is a rectangle, and a maximum inner diameter of the outlet equals to a length of a diagonal line of the rectangle.

One embodiment of the invention provides a projector, herein a number of the at least one side surface is two, the two side surfaces face each other, a number of the at least one heat dissipation airflow providing device is two, the wavelength conversion device is disposed between the two heat dissipation airflow providing devices, and the outlet of each of the heat dissipation airflow providing devices faces the corresponding side surface.

One embodiment of the invention provides a projector, herein the heat dissipation airflow providing device having a wind-guiding cover, and the wind-guiding cover is connected to the outlet and guides the heat dissipation airflow toward the side surface.

One embodiment of the invention provides a projector, herein the wind-guiding cover has a first opening and a second opening opposite to each other, the first opening is connected with the outlet, the second opening faces the side surface, and an inner diameter of the second opening is smaller than or equal to an outer diameter of the side surface.

One embodiment of the invention provides a projector, herein the wavelength conversion device includes a phosphor wheel or a color filter wheel.

One embodiment of the invention provides a projector, herein the wavelength conversion device includes a driving unit and a sensing unit, the driving unit is connected to the phosphor wheel and adapted to drive the phosphor wheel to rotate, and the sensing unit is disposed on one side of the driving unit and adapted to sense an operation state of the driving unit.

One embodiment of the invention provides a projector, herein the wavelength conversion module includes an enclosed cavity and a heat dissipation structure, the wavelength conversion device and the heat dissipation airflow providing device are disposed inside the enclosed cavity, the heat dissipation structure includes a first portion and a second portion connected to each other, the first portion is located inside the enclosed cavity and the second portion is located outside the enclosed cavity, the heat dissipation airflow flows through the wavelength conversion device and the first portion sequentially, and a heat energy of the heat dissipation airflow is transferred through the first portion to the second portion.

One embodiment of the invention provides a projector, herein the heat dissipation airflow providing device is a centrifugal fan, an axial fan, or a refrigerating air-conditioning blower.

Based on the above-mentioned, the embodiment of the invention at least has one of following advantages. In the above-mentioned embodiment of the invention, the orthogonal projection of the outlet of the heat dissipation airflow providing device on the side surface of the wavelength conversion device is closer to the center of this side surface. Therefore, the heat dissipation airflow provided by the heat dissipation airflow providing device could flow uniformly to the periphery of the side surface from a position closed to the center, such that the heat dissipation of the wavelength conversion device is effectively performed.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional technology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
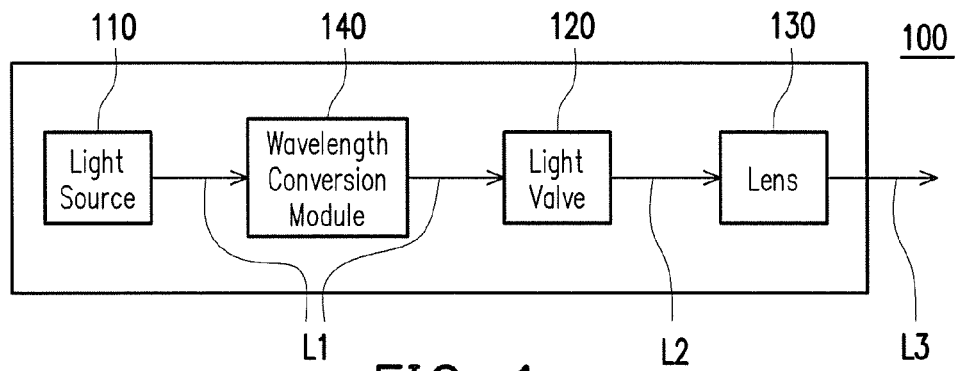
FIG. 1 is a schematic view of a projector of one embodiment of the invention.

FIG. 1 is a schematic view of a projector of one embodiment of the invention. Referring to FIG. 1, a projector 100 of one embodiment of the invention includes a light source 110, a light valve 120, a lens 130, and a wavelength conversion module 140. The light source 110, for example, is a laser light source and is adapted to provide an illumination light beam L1. The wavelength conversion module 140 is disposed on the transmission path of the illumination light beam L1 and adapted to convert the wavelength of the illumination light beam L1. The light valve 120 is disposed on the transmission path of the illumination light beam L1 and adapted to convert the illumination light beam L1 to an image light beam L2. The lens 130 is located on the transmission path of the image light beam L2 and adapted to convert the image light beam L2 to a projection light beam L3.

Figure 2:
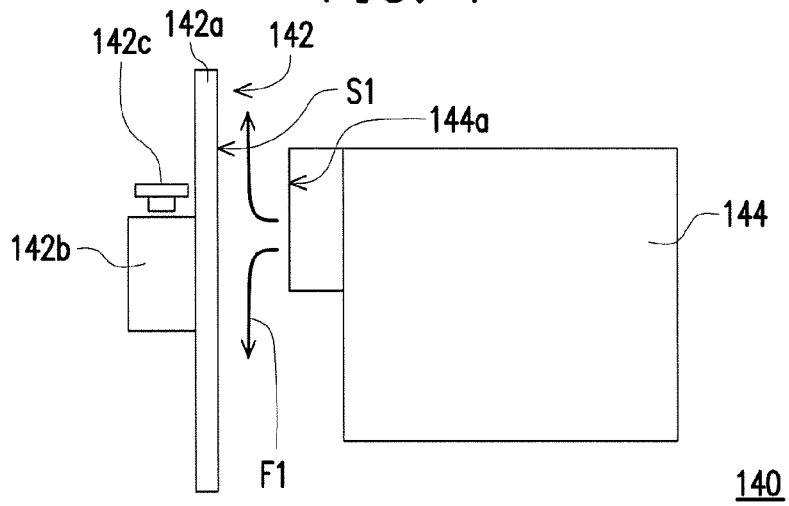
FIG. 2 is a top view of a wavelength conversion module in FIG. 1.
Figure 3:
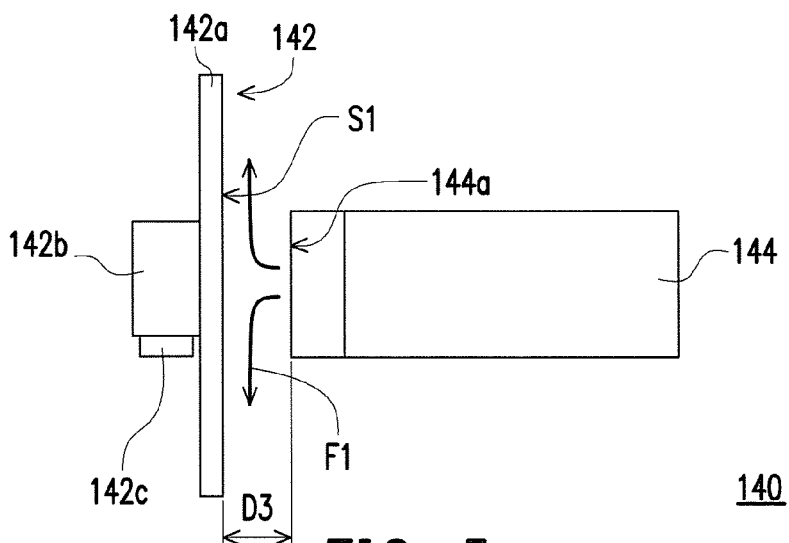
FIG. 3 is a front view of the wavelength conversion module in FIG. 2.
Figure 4:
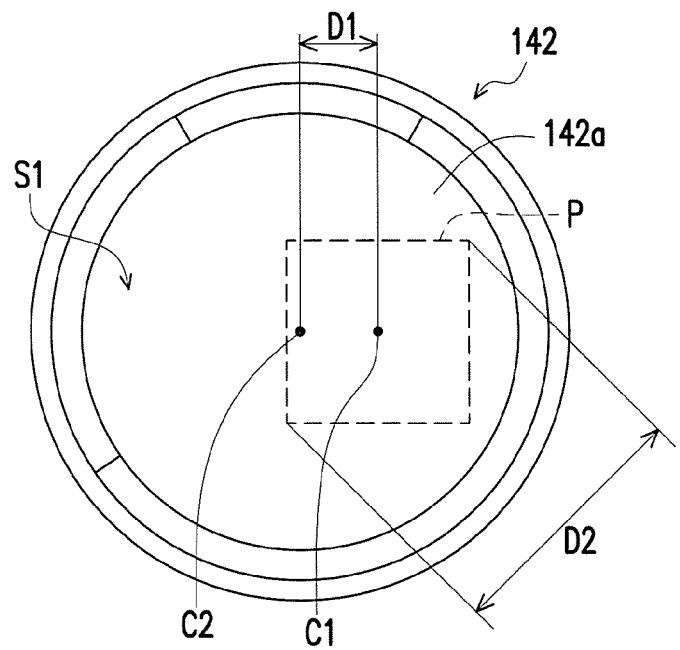
FIG. 4 is a side view of the wavelength conversion module in FIG. 2.

FIG. 2 is a top view of a wavelength conversion module in FIG. 1. FIG. 3 is a front view of the wavelength conversion module in FIG. 2. FIG. 4 is a side view of the wavelength conversion module in FIG. 2. Referring to FIGS. 2 to 4, the wavelength conversion module 140 includes a wavelength conversion device 142 and at least one heat dissipation airflow providing device 144. The wavelength conversion device 142 has at least one side surface S1. The heat dissipation airflow providing device 144, for example, is a centrifugal fan and has an outlet 144a. The outlet 144a faces the side surface S1 of the wavelength conversion device 142, and the heat dissipation airflow providing device 144 is adapted to provide a heat dissipation airflow F1 to the side surface S1 of the wavelength conversion device 142 from the outlet 144a. A distance between a geometry center C1 of an orthogonal projection P (as shown in FIG. 4) of the outlet 144a on the side surface S1 and a geometry center C2 of the side surface S1 is smaller than or equal to half of a maximum inner diameter D2 of the outlet 144a.

By this disposing manner, the orthogonal projection P of the outlet 144a of the heat dissipation airflow providing device 144 on the side surface S1 of the wavelength conversion device 142 is closer to the geometry center C2 of the side surface S1. Therefore, the heat dissipation airflow F1 provided by the heat dissipation airflow providing device 144 could flow uniformly to the periphery of the side surface S1 from a position closed to the geometry center C2, such that the heat dissipation of the wavelength conversion device 142 is effectively performed.

In this embodiment, a distance D3 between the outlet 144a of the heat dissipation airflow providing device 144 and the side surface S1 of the wavelength conversion device 142 ranges 5~50 mm, and the preferred distance is 35 mm. Thus, an appropriate distance is kept between the outlet 144a and the wavelength conversion device 142, such that the heat dissipation airflow F1 could flow smoothly along the side surface S1 of the wavelength conversion device 142. In another embodiment, another appropriate distance is kept between the outlet 144a and the side surface S1, but the invention is not limited thereto.

From the orthogonal projection P (as shown in FIG. 4) of the outlet 144a (as shown in FIGS. 2 and 3) on the side surface S1, it is known that the outlet 144a is a rectangle, and the maximum inner diameter D2 of the outlet 144a equals to a diagonal line of the rectangle. The invention is not limited thereto, in another embodiment, the outlet 144a could be designed as other different appropriate shapes.

Referring to FIGS. 2 to 4, the wavelength conversion device 142 of this embodiment includes a phosphor wheel 142a, a driving unit 142b, and a sensing unit 142c. The driving unit 142b is connected to the phosphor wheel 142a and adapted to drive the phosphor wheel 142a to rotate, and the sensing unit 142c is disposed on one side of the driving unit 142b and adapted to sense the operation state of the driving unit 142b, for the projector 100 (as shown in FIG. 1) to control the operation of the wavelength conversion device 142. In another embodiment, the wavelength conversion device 142 could also include a light filtration color wheel (not shown), but the invention is not limited thereto.

Figure 5:
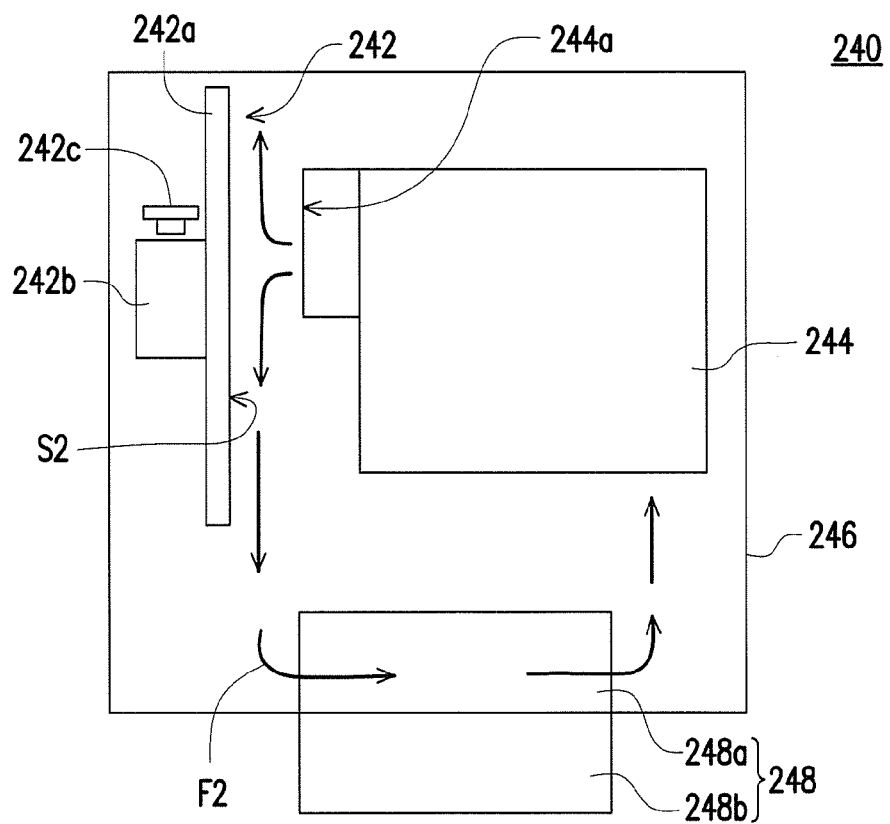
FIG. 5 is a schematic view of a wavelength conversion module according to another embodiment of the invention.

FIG. 5 is a schematic view of a wavelength conversion module according to another embodiment of the invention. In the wavelength conversion module 240 of FIG. 5, the disposing and operating of the wavelength conversion device 242, the phosphor wheel 242a, the side surface S2, the driving unit 242b, the sensing unit 242c, the heat dissipation airflow providing device 244 and the outlet 244a is similar to the disposing and operating of the wavelength conversion device 142, the phosphor wheel 142a, the side surface S1, the driving unit 142b, the sensing unit 142c, the heat dissipation airflow providing device 144 and the outlet 144a in FIG. 2, and the details are not mentioned again. The differences between the wavelength conversion module 240 and the wavelength conversion module 140 are described as follow.

The wavelength conversion module 240 includes an enclosed cavity 246 and a heat dissipation structure 248. The wavelength conversion device 242 and the heat dissipation airflow providing device 244 are disposed inside the enclosed cavity 246. The heat dissipation structure 248 includes a first portion 248a and a second portion 248b, which are connected to each other. The first portion 248a, for example, is a heat dissipation fin set and located inside the enclosed cavity 246, and the second portion 248b, for example, is a heat dissipation fin set and located outside the enclosed cavity 246. The heat dissipation airflow F2 provided by the heat dissipation airflow providing device 244 flows through the wavelength conversion device 242 and the first portion 248a sequentially, and the heat energy of the heat dissipation airflow F2 is transferred through the first portion 248a inside the enclosed cavity 246 to the second portion 248b outside the enclosed cavity 246 such that the heat dissipation of the wavelength conversion device is effectively performed. In another embodiment, the wavelength conversion module could use different heat dissipation structure to transfer the thermal energy to outside, but the invention is not limited thereto.

Figure 6:
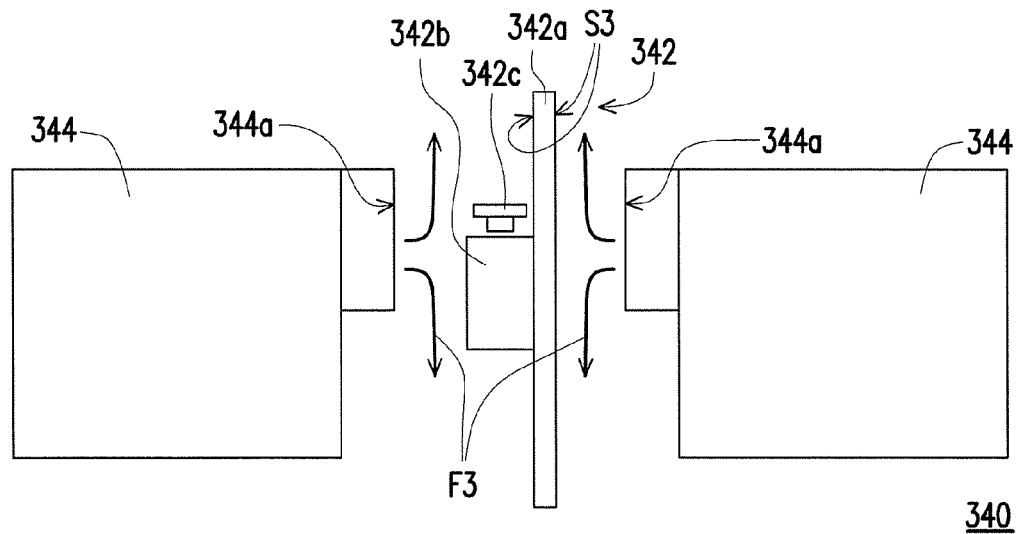
FIG. 6 is a schematic view of a wavelength conversion module according to another embodiment of the invention.

FIG. 6 is a schematic view of a wavelength conversion module according to another embodiment of the invention. In the wavelength conversion module 340 of FIG. 6, the disposing and operating of the wavelength conversion device 342, the phosphor wheel 342a, the driving unit 342b, the sensing unit 342c, the heat dissipation airflow providing device 344 and the outlet 344a is similar to the disposing and operating of the wavelength conversion device 142, the phosphor wheel 142a, the driving unit 142b, the sensing unit 142c, the heat dissipation airflow providing device 144 and the outlet 144a, and the details are not mentioned again. The differences between the wavelength conversion module 340 and the wavelength conversion module 140 are described as follow.

The wavelength conversion device has two side surfaces S3 opposite to each other, the number of the heat dissipation airflow providing devices 344 is two, and the wavelength conversion device 342 is disposed between the two heat dissipation airflow providing devices 344, and the outlet 344a of each of the heat dissipation airflow providing devices 344 faces the corresponding side surface S3, such that the heat dissipation of the wavelength conversion device 342 is performed by the heat dissipation airflow F3 with a greater flow rate.

Figure 7:
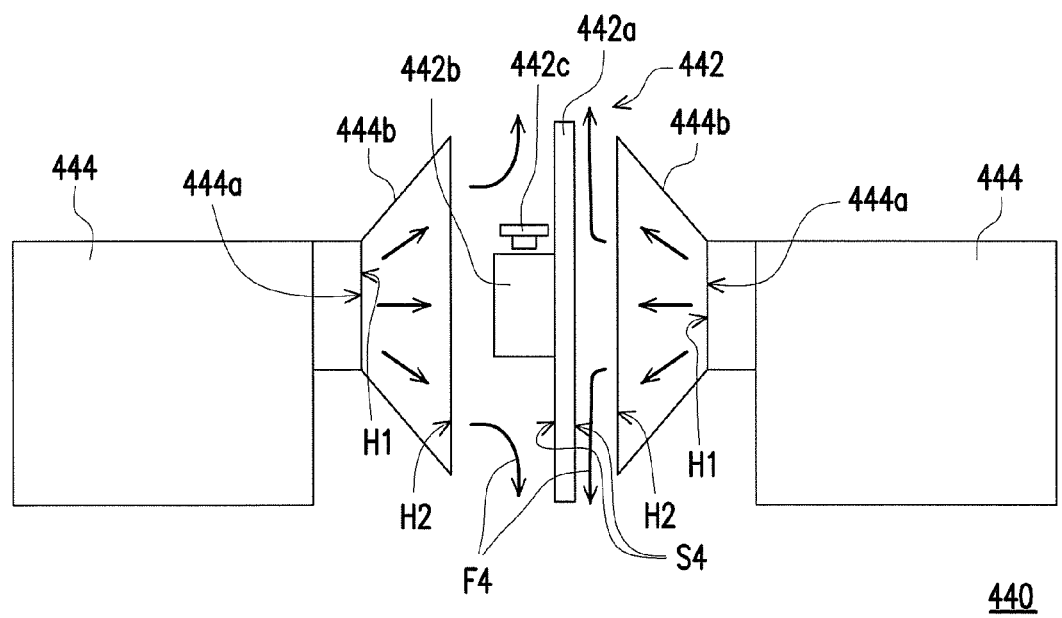
FIG. 7 is a schematic view of a wavelength conversion module according to another embodiment of the invention.

FIG. 7 is a schematic view of a wavelength conversion module according to another embodiment of the invention. In the wavelength conversion module 440 of FIG. 7, disposing and operating of the wavelength conversion device 442, the phosphor wheel 442a, the side surface S4, the driving unit 442b, the sensing unit 442c, the heat dissipation airflow providing device 444 and the outlet 444a is similar to the disposing and operating of the wavelength conversion device 342, the phosphor wheel 342a, the side surface S3, the driving unit 342b, the sensing unit 342c, the heat dissipation airflow providing device 344 and the outlet 344a in FIG. 6, and the details are not mentioned again. The differences between the wavelength conversion module 440 and the wavelength conversion module 340 are described as follow.

Each heat dissipation airflow providing device 444 has a wind-guiding cover 444b, the wind-guiding cover 444b is connected to the outlet 444a and guides the heat dissipation airflow F4 to the side surface S4. To be more specific, each wind-guiding cover 444b has a first opening H1 and a second opening H2 opposite to each other, the first opening H1 is connected with the outlet 444a of the heat dissipation airflow providing device 444, and the second opening H2 faces the side surface S4 of the wavelength conversion device 442, such that the heat dissipation airflow F4 flows through the first opening H1 and goes into the wind-guiding cover 444b and then flows through the second opening H2 to the wavelength conversion device 442. Herein, the inner diameter of the second opening H2 of the wind-guiding cover 444b, for example, is smaller than or equal to the outer diameter of the side surface S4 of the wavelength conversion device 442, such that the heat dissipation airflow F4 is entirely guided to the side surface S4 of the wavelength conversion device 442.

Figure 8:
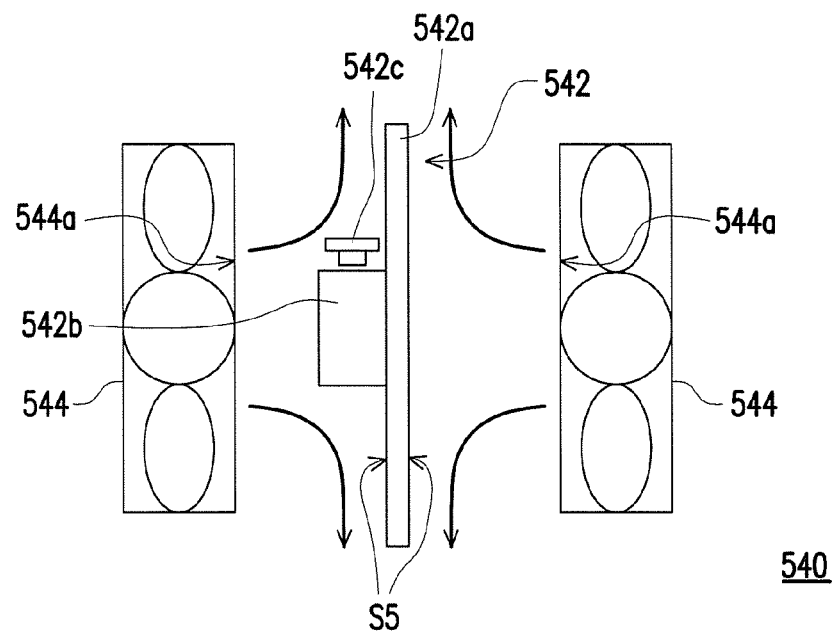
FIG. 8 is a schematic view of a wavelength conversion module according to another embodiment of the invention.

FIG. 8 is a schematic view of a wavelength conversion module according to another embodiment of the invention. In the wavelength conversion module 540 of FIG. 8, the disposing and operating of the wavelength conversion device 542, the phosphor wheel 542a, the side surface S5, the driving unit 542b, the sensing unit 542c, the heat dissipation airflow providing device 544 and the outlet 544a is similar to the disposing and operating of the wavelength conversion device 342, the phosphor wheel 342a, the side surface S3, the driving unit 342b, the sensing unit 342c, the heat dissipation airflow providing device 344 and the outlet 344a in FIG. 6, and the details are not mentioned again. The differences between the wavelength conversion module 540 and the wavelength conversion module 340 are: the heat dissipation airflow providing device 544, for example, is an axial fan but not a centrifugal fan.

Figure 9:
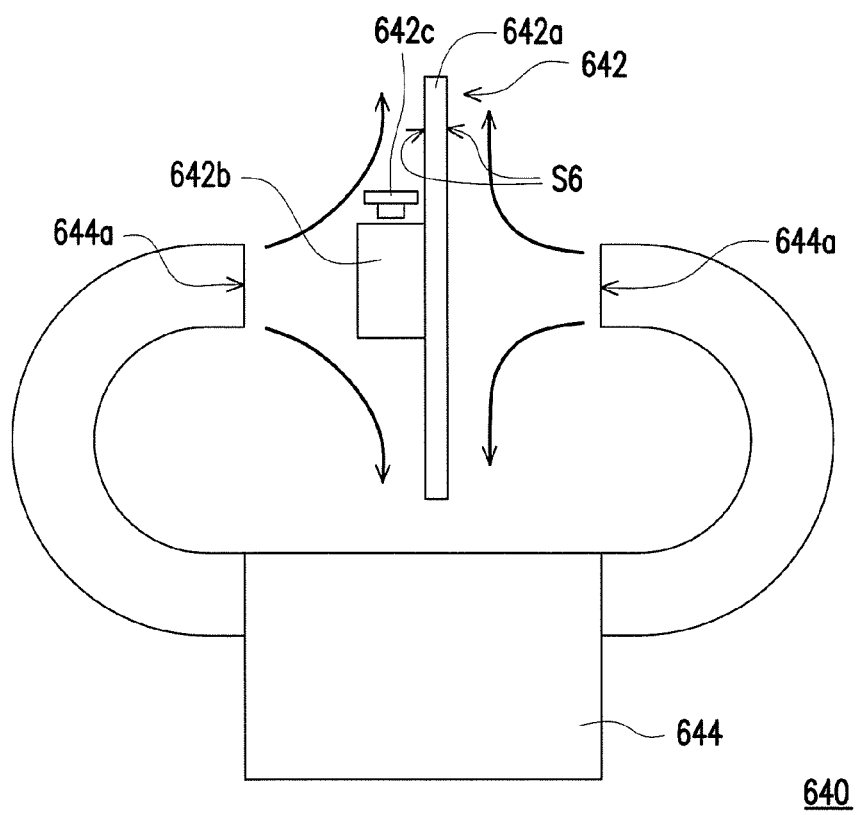
FIG. 9 is a schematic view of a wavelength conversion module according to another embodiment of the invention.

FIG. 9 is a schematic view of a wavelength conversion module according to another embodiment of the invention. In the wavelength conversion module 640 of FIG. 9, the disposing and operating of the wavelength conversion device 642, the phosphor wheel 642a, the side surface S6, the driving unit 642b, the sensing unit 642c, the heat dissipation airflow providing device 644 and the outlet 644a is similar to the disposing and operating of the wavelength conversion device 342, the phosphor wheel 342a, the side surface S3, the driving unit 342b, the sensing unit 342c, the heat dissipation airflow providing device 344 and the outlet 344a in FIG. 6, and the details are not mentioned again. The differences between the wavelength conversion module 640 and the wavelength conversion module 340 are: the heat dissipation airflow providing device 644, for example, is a refrigerating air-conditioning blower but not a plurality of centrifugal fans.

In summary, the embodiment of the invention has at least one of following advantages. In the above-mentioned embodiment of the invention, the orthogonal projection of the outlet of the heat dissipation airflow providing device on the side surface of the wavelength conversion device is more close to the center of this side surface. Therefore, the heat dissipation airflow provided by the heat dissipation airflow providing device could flow uniformly to the periphery of the side surface from a position closed to the center, such that the heat dissipation of the wavelength conversion device is effectively performed.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such tenns should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A wavelength conversion module, comprising:
   a wavelength conversion device having at least one side surface; and
   at least one heat dissipation airflow providing device having an outlet, wherein the outlet faces the side surface, the heat dissipation airflow providing device is adapted to provide a heat dissipation airflow to the side surface from the outlet, and a distance between a geometry center of an orthogonal projection of the outlet on the side surface and a geometry center of the side surface is smaller than or equal to half of a maximum inner diameter of the outlet.

2. The wavelength conversion module according to claim 1, wherein a distance between the outlet and the side surface ranges 5~50 mm.

3. The wavelength conversion module according to claim 1, wherein the outlet is a rectangle, and a maximum inner diameter of the outlet equals to a length of a diagonal line of the rectangle.

4. The wavelength conversion module according to claim 1, wherein a number of the at least one side surface is two, the two side surfaces face each other, a number of the at least one heat dissipation airflow providing device is two, the wavelength conversion device is disposed between the two heat dissipation airflow providing devices, and the outlet of each of the heat dissipation airflow providing devices faces the corresponding side surface.

5. The wavelength conversion module according to claim 1, wherein the heat dissipation airflow providing device has a wind-guiding cover, and the wind-guiding cover is connected to the outlet and guide the heat dissipation airflow toward the side surface.

6. The wavelength conversion module according to claim 5, wherein the wind-guiding cover has a first opening and a second opening opposite to each other, the first opening is connected with the outlet, the second opening faces the side surface, and an inner diameter of the second opening is smaller than or equal to an outer diameter of the side surface.

7. The wavelength conversion module according to claim 1, wherein the wavelength conversion device comprises a phosphor wheel or a color filter wheel.

8. The wavelength conversion module according to claim 7, wherein the wavelength conversion device comprises a driving unit and a sensing unit, the driving unit is connected to the phosphor wheel and adapted to drive the phosphor wheel to rotate, and the sensing unit is disposed on one side of the driving unit and adapted to sense an operation state of the driving unit.

9. The wavelength conversion module according to claim 1, wherein the wavelength conversion module comprises an enclosed cavity and a heat dissipation structure, wherein the wavelength conversion device and the heat dissipation airflow providing device are disposed inside the enclosed cavity, the heat dissipation structure comprises a first portion and a second portion connected to each other, the first portion is located inside the enclosed cavity and the second portion is located outside the enclosed cavity, the heat dissipation airflow flows through the wavelength conversion device and the first portion sequentially, and a heat energy of the heat dissipation airflow is transferred through the first portion to the second portion.

10. The wavelength conversion module according to claim 1, wherein the heat dissipation airflow providing device is a centrifugal fan, an axial fan, or a refrigerating air-conditioning blower.

11. A projector, comprising:
    a light source adapted to provide an illumination light beam;
    a light valve located on a transmission path of the illumination light beam and adapted to covert the illumination light beam to a image light beam;
    a lens located on a transmission path of the image light beam and adapted to covert the image light beam to a projection light beam; and
    a wavelength conversion module disposed on the transmission path of the illumination light beam, located between the light source and the light valve and comprising:
       a wavelength conversion device having at least one side surface; and
       at least one heat dissipation airflow providing device having an outlet, wherein the outlet faces the side surface, the heat dissipation airflow providing device is adapted to provide a heat dissipation airflow to the side surface from the outlet, and a distance between a geometry center of an orthogonal projection of the outlet on the side surface and a geometry center of the side surface is smaller than or equal to half of a maximum inner diameter of the outlet.

12. The projector according to claim 11, wherein a distance between the outlet and the side surface ranges 5~50 mm.

13. The projector according to claim 11, wherein the outlet is a rectangle, and a maximum inner diameter of the outlet equals to a length of a diagonal line of the rectangle.

14. The projector according to claim 11, wherein a number of the at least one side surface is two, the two side surfaces face each other, a number of the at least one heat dissipation airflow providing device is two, the wavelength conversion device is disposed between the two heat dissipation airflow providing devices, and the outlet of each of the heat dissipation airflow providing devices faces the corresponding side surface.

15. The projector according to claim 11, wherein the heat dissipation airflow providing device having a wind-guiding cover, and the wind-guiding cover is connected to the outlet and guides the heat dissipation airflow toward the side surface.

16. The projector according to claim 15, wherein the wind-guiding cover has a first opening and a second opening opposite to each other, the first opening is connected with the outlet, the second opening faces the side surface, and an inner diameter of the second opening is smaller than or equal to an outer diameter of the side surface.

17. The projector according to claim 11, wherein the wavelength conversion device comprises a phosphor wheel or a color filter wheel.

18. The projector according to claim 17, wherein the wavelength conversion device comprises a driving unit and a sensing unit, the driving unit is connected to the phosphor wheel and adapted to drive the phosphor wheel to rotate, and the sensing unit is disposed on one side of the driving unit and adapted to sense an operation state of the driving unit.

19. The projector according to claim 11, wherein the wavelength conversion module comprises a enclosed cavity and a heat dissipation structure, the wavelength conversion device and the heat dissipation airflow providing device are disposed inside the enclosed cavity, the heat dissipation structure comprises a first portion and a second portion connected to each other, the first portion is located inside the enclosed cavity and the second portion is located outside the enclosed cavity, the heat dissipation airflow flows through the wavelength conversion device and the first portion sequentially, and a heat energy of the heat dissipation airflow is transferred through the first portion to the second portion.

20. The projector according to claim 11, wherein the heat dissipation airflow providing device is a centrifugal fan, an axial fan, or a refrigerating air-conditioning blower.

* * * * *